United States Patent
Seo et al.

(10) Patent No.: US 11,237,790 B2
(45) Date of Patent: Feb. 1, 2022

(54) IMAGE DISPLAY DEVICE AND VIDEO WALL INCLUDING THE SAME

(71) Applicant: LG ELECTRONICS INC., Seoul (KR)

(72) Inventors: Daeseong Seo, Seoul (KR); Yanghyun Kim, Seoul (KR); Wonsik Kim, Seoul (KR); Jonggon Shin, Seoul (KR); Jongjin Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/932,527

(22) Filed: Jul. 17, 2020

(65) Prior Publication Data

US 2021/0141584 A1     May 13, 2021

(51) Int. Cl.
  *G06F 3/14* (2006.01)
  *H04W 4/80* (2018.01)
  *H01Q 1/52* (2006.01)
  *H04L 27/02* (2006.01)

(52) U.S. Cl.
  CPC .......... *G06F 3/1446* (2013.01); *H01Q 1/525* (2013.01); *H04L 27/02* (2013.01); *H04W 4/80* (2018.02)

(58) Field of Classification Search
  CPC . G06F 3/1446; G06F 3/1423; G09G 2370/18; G09G 2370/16; H04W 4/80; H01Q 1/525; H04L 27/02
  See application file for complete search history.

(56) References Cited

U.S. PATENT DOCUMENTS

| | | | | |
|---|---|---|---|---|
| 6,492,973 B1* | 12/2002 | Kuroki | ................... | G09G 5/006 345/100 |
| 10,454,526 B1* | 10/2019 | Khidre | ................... | H05K 9/006 |
| 2012/0286049 A1 | 11/2012 | McCormack et al. | | |
| 2013/0266154 A1* | 10/2013 | McCormack | ........... | H04R 3/00 381/117 |
| 2017/0324446 A1 | 11/2017 | Cook et al. | | |
| 2019/0087146 A1* | 3/2019 | Yang | ..................... | G06F 3/1446 |

FOREIGN PATENT DOCUMENTS

| | | |
|---|---|---|
| JP | 2011257540 | 12/2011 |
| JP | 2014-187507 | 10/2014 |
| KR | 1020120117126 | 10/2012 |

OTHER PUBLICATIONS

European Patent Office Application Serial No. 20186003.8, Search Report dated Dec. 14, 2020, 9 pages.
Korean Intellectual Property Office Application No. 10-2019-0143613, Office Action dated Sep. 18, 2020, 8 pages.

* cited by examiner

*Primary Examiner* — Robert J Michaud
(74) *Attorney, Agent, or Firm* — Lee Hong Degerman Kang & Waimey

(57) ABSTRACT

An image display device and a video wall including the same are disclosed. The image display device includes a housing, a display configured to display an image, a first wireless communication module disposed on one surface of the housing, and a second wireless communication module disposed at a position on an opposite surface of the housing corresponding to a position of the first wireless communication module. The first wireless communication module and the second wireless communication module transmit and receive a signal through the same short-range communication method. Various other embodiments are possible.

13 Claims, 14 Drawing Sheets

IMAGE DISPLAY DEVICE AND VIDEO WALL INCLUDING THE SAME

CROSS-REFERENCE TO RELATED APPLICATION

Pursuant to 35 U.S.C. § 119(a), this application claims the benefit of earlier filing date and right of priority to Korean Patent Application No. 10-2019-0143613, filed on Nov. 11, 2019, the contents of which are all hereby incorporated by reference herein in its entirety.

BACKGROUND OF THE INVENTION

Field of the Disclosure

The present disclosure relates to an image display device and a video wall including the same.

Description of the Related Art

An image display device is a device having a function of displaying an image that can be viewed by a user. Examples of an image display device may include a television (TV) equipped with a liquid crystal display (LCD) using a liquid crystal or an organic light-emitting diode (OLED) display using an OLED.

A video wall is a device that displays an image through a plurality of displays, and is generally used for commercial purposes, such as advertising, outside or inside a building.

In general, in the case in which a video wall is constituted by a plurality of image display devices arranged adjacent to each other, power lines for supplying power or cables for transmitting image signals are respectively connected to each of the plurality of image display devices.

For example, all of the image display devices may be connected to an external device, which transmits image signals, via cables, or may be connected to each other via cables so as to transmit image signals to each other.

As the number of image display devices constituting a video wall increases, the connection of power lines and cables becomes more complicated, and, when the arrangement of the image display devices is changed or some of the image display devices are replaced, there is inconvenience in installation in that power lines and cables need to be reconnected.

SUMMARY OF THE INVENTION

It is an object of the present disclosure to solve the above and other problems.

It is another object of the present disclosure to provide an image display device and a digital wall including the same for improving convenience in installation in the case in which the digital wall is constituted by a plurality of image display devices.

An image display device in accordance with an exemplary embodiment of the present disclosure for accomplishing the above and other objects may include a housing, a display configured to display an image, a first wireless communication module disposed on one surface of the housing, and a second wireless communication module disposed at a position on an opposite surface of the housing corresponding to a position of the first wireless communication module. The first wireless communication module and the second wireless communication module may transmit and receive a signal through the same short-range communication method.

A digital wall in accordance with an exemplary embodiment of the present disclosure may include a plurality of image display devices, and each of the plurality of image display devices may include a housing, a display configured to display an image, a first wireless communication module disposed on one surface of the housing, and a second wireless communication module disposed at a position on an opposite surface of the housing corresponding to a position of the first wireless communication module. The first wireless communication module and the second wireless communication module may transmit and receive a signal through the same short-range communication method. Among the plurality of image display devices, a first image display device and a second image display device may be disposed adjacent to each other such that the first wireless communication module of the first image display device and the second wireless communication module of the second image display device face each other.

The additional range of applicability of the present disclosure will become apparent from the following detailed description. However, because various changes and modifications will be clearly understood by those skilled in the art within the spirit and scope of the present disclosure, it should be understood that the detailed description and specific embodiments such as preferred embodiments of the present disclosure are merely given by way of example.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1A:
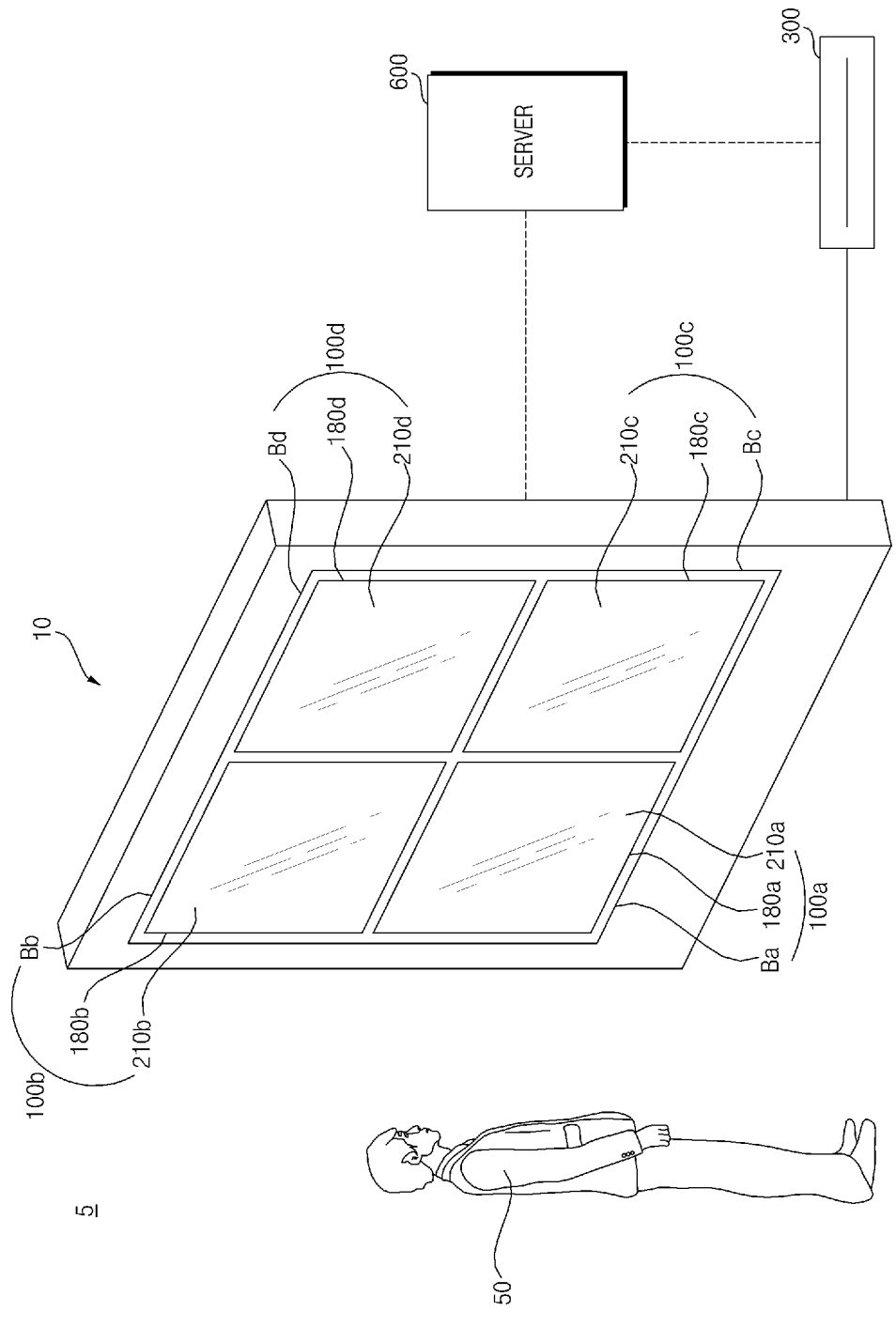
FIGS. 1A and 1B are diagrams illustrating image display systems according to various embodiments of the present disclosure.

Hereinafter, the present disclosure will be described in detail with reference to the accompanying drawings. In order to clearly and briefly describe the present disclosure, components that are irrelevant to the description will be omitted in the drawings. The same reference numerals are used throughout the drawings to designate the same or similar components.

Terms "module" and "part" for elements used in the following description are given simply in view of the ease of the description, and do not carry any important meaning or role. Therefore, the "module" and the "part" may be used interchangeably.

It should be understood that the terms "comprise", "include", "have", etc. when used in this specification, specify the presence of stated features, integers, steps, operations, elements, components, or combinations of them but do not preclude the presence or addition of one or more other features, integers, steps, operations, elements, components, or combinations thereof.

It will be understood that, although the terms "first", "second", etc. may be used herein to describe various elements, these elements should not be limited by these terms. These terms are only used to distinguish one element from another element.

Unless otherwise defined, all terms including technical and scientific terms used herein have the same meaning as commonly understood by one of ordinary skill in the art to which the present disclosure belongs. Further, terms defined in a common dictionary will not be interpreted in an idealized or overly formal sense unless expressly so defined herein.

In the drawings, the thicknesses or the sizes of elements and graphs may be exaggerated, omitted or simplified to more clearly and conveniently illustrate the present disclosure.

Figure 1B:
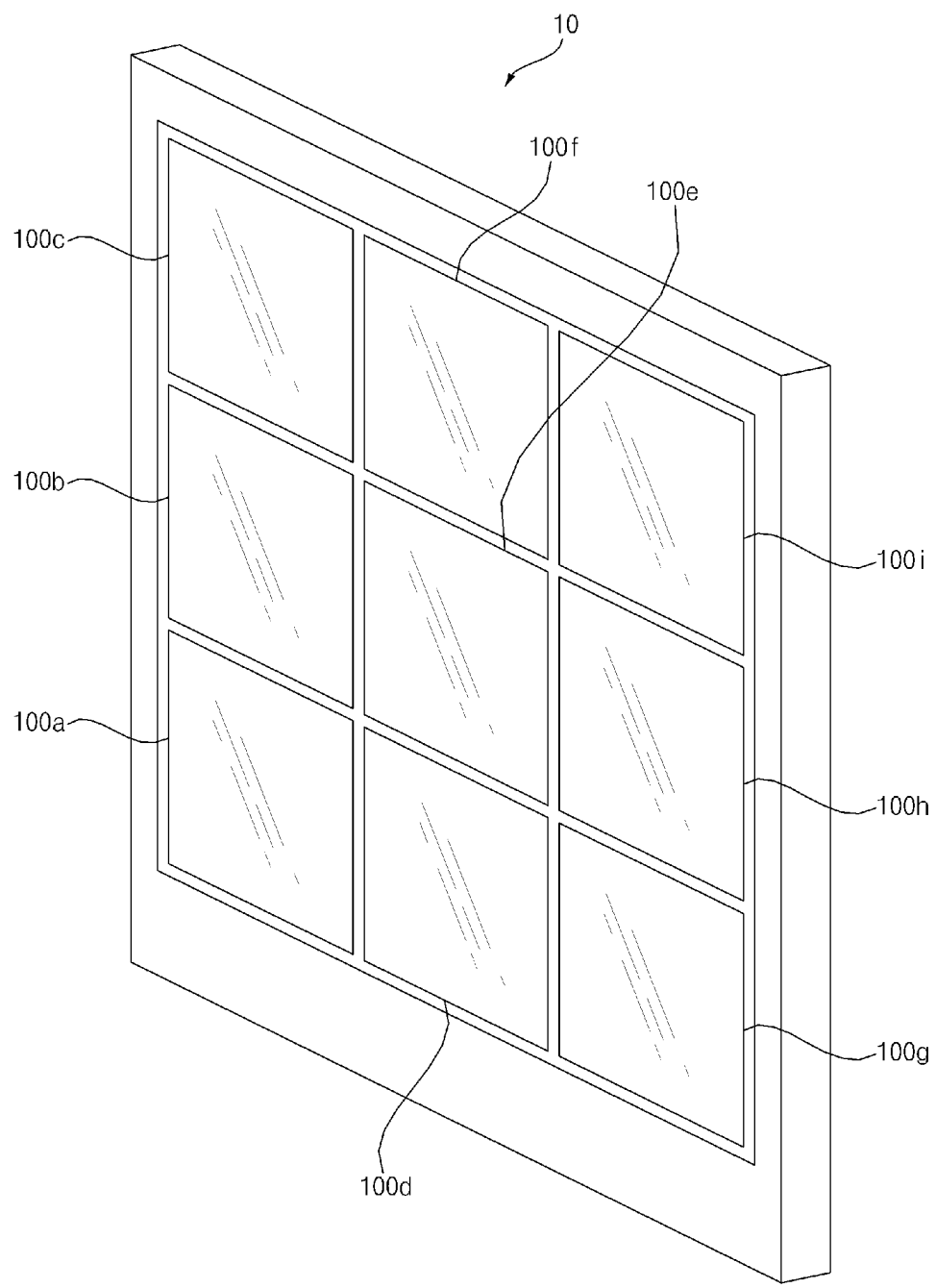

FIGS. 1A and 1B are diagrams illustrating image display systems according to various embodiments of the present disclosure.

Referring to FIG. 1A, an image display system 5 may include a video wall 10, a set-top box 300, and/or a server 600.

The video wall 10 may be installed in a public place, inside or outside a building, etc.

For example, the video wall 10 may be installed in vehicles or public facilities, such as terminals, train stations, and airports, in order to provide information such as advertising, news, and announcements. Further, the video wall 10 may also be installed in the vicinity of show windows in department stores, shopping malls, supermarkets, or the like in order to advertise specific goods.

The video wall 10 may include a plurality of image display devices 100a to 100d. As illustrated in the drawings, a viewer 50 is capable of viewing images displayed on the video wall 10. In particular, the viewer 50 is capable of viewing images displayed through the plurality of image display devices 100a to 100d.

The plurality of image display devices 100a to 100d may respectively include displays 180a to 180d configured to display images.

The plurality of displays 180a to 180d may be implemented as any of various types of display panels. For example, the plurality of displays 180a to 180d may include any one of a liquid crystal display (LCD) panel, an organic light-emitting diode (OLED) panel, and an inorganic light-emitting diode (LED) panel.

The plurality of displays 180a to 180d may include a plurality of panels 210a to 210d and bezels Ba to Bd respectively surrounding the panels 210a to 210d.

The video wall 10 may receive image signals from the set-top box 300, the server 600, and external/internal memory.

For example, at least one of the plurality of image display devices 100a to 100d included in the video wall 10 may receive image signals from the set-top box 300, the server 600, and external/internal memory, and may transmit the received image signals to other image display devices. In this case, the plurality of image display devices 100a to 100d may exchange data wirelessly with other image display devices disposed adjacent thereto.

For example, the first image display device 100a included in the video wall 10 may receive image signals from the set-top box 300 through a high-definition multimedia interface (HDMI) terminal, and may wirelessly transmit the received image signals to the second image display device 100b.

For example, the first image display device 100a included in the video wall 10 may receive image signals from the server 600 through a network cable terminal, and may wirelessly transmit the received image signals to the second image display device 100b.

The plurality of image display devices 100a to 100d included in the video wall 10 may transmit power to each other.

For example, the first image display device 100a included in the video wall 10 may be connected to a commercial power supply to receive power, and may supply power to the second image display device 100b.

Although the video wall 10 is illustrated in FIG. 1A as including four image display devices 100a to 100d, the disclosure is not limited thereto. The video wall 10 may include two, three, or five or more image display devices.

As illustrated in FIG. 1B, the video wall 10 may be constituted by nine image display devices 100a to 100i.

For example, when the video wall 10 includes nine image display devices 100a to 100i, the first image display device 100a, the fourth image display device 100d, and the seventh image display device 100g may respectively receive image signals from the set-top box 300, the server 600, and the external/internal memory.

In this case, the first image display device 100a, the fourth image display device 100d, and the seventh image display device 100g may respectively transmit the received image signals wirelessly to other image display devices 100b, 100e and 100h disposed adjacent thereto.

Figure 2:
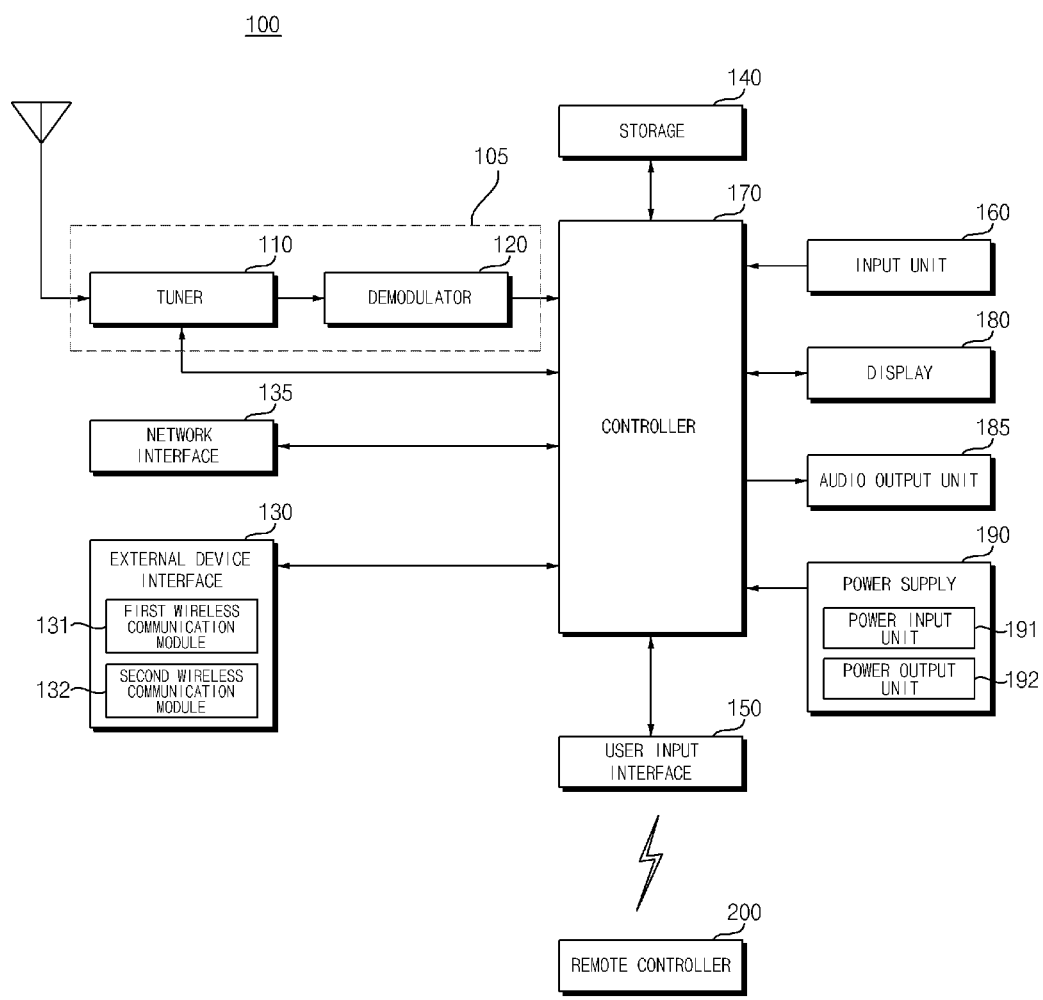
FIG. 2 is a block diagram of the internal configuration of the image display device of FIG. 1.

FIG. 2 is a block diagram of the internal configuration of the image display device of FIG. 1.

Referring to FIG. 2, the image display device 100 may include a broadcast receiver 105, an external device interface 130, a network interface 135, a storage 140, a user input interface 150, an input unit 160, a controller 170, a display 180, an audio output unit 185, and/or a power supply 190.

The broadcast receiver 105 may include a tuner 110 and a demodulator 120.

Unlike the configuration illustrated in the drawings, the image display device 100 may include only the external device interface 130 and the network interface 135, among the broadcast receiver 105, the external device interface 130, and the network interface 135. That is, the image display device 100 may not include the broadcast receiver 105.

The tuner 110 may tune a broadcast signal corresponding to a channel selected by a user or each of all pre-stored channels from among broadcast signals received through an antenna (not shown) or a cable (not shown). The tuner 110 may convert the tuned broadcast signal into an intermediate frequency (IF) signal or a baseband image or audio signal.

If the tuned broadcast signal is a digital broadcast signal, the tuner 110 may convert the tuned broadcast signal into a digital IF (DIF) signal. If the tuned broadcast signal is an analog broadcast signal, the tuner 110 may convert the tuned broadcast signal into an analog baseband image or audio (CVBS/SIF) signal. That is, the tuner 110 may process a digital broadcast signal or an analog broadcast signal. The analog baseband image or audio (CVBS/SIF) signal output from the tuner 110 may be directly input to the controller 170.

The tuner 110 may sequentially tune broadcast signals corresponding to all broadcast channels stored through a channel memory function from among the received broadcast signals, and may convert the tuned broadcast signals into intermediate frequency signals or baseband image or audio signals.

The tuner 110 may be implemented as a plurality of tuners in order to receive broadcast signals corresponding to a plurality of channels. Alternatively, the tuner 110 may be implemented as a single tuner capable of simultaneously receiving broadcast signals corresponding to a plurality of channels.

The demodulator 120 may receive the digital IF (DIF) signal converted by the tuner 110, and may demodulate the digital IF (DIF) signal.

The demodulator 120 may perform demodulation and channel decoding, and may then output a stream signal (TS). The stream signal may be a signal in which an image signal, an audio signal and a data signal are multiplexed.

The stream signal output from the demodulator 120 may be input to the controller 170. The controller 170 may perform demultiplexing and video/audio signal processing. Thereafter, the controller 170 may output an image through the display 180, and may output a sound through the audio output unit 185.

The external device interface 130 may transmit and receive data to and from an external device connected thereto. To this end, the external device interface 130 may include an A/V input/output unit (not shown).

The external device interface 130 may be connected to an external device such as a Digital Versatile Disc (DVD) player, a Blu-ray player, a game console, a camera, a camcorder, a computer (e.g. a laptop computer), or a set-top box in a wired or wireless manner, and may perform input/output operation with the external device.

In addition, the external device interface 130 may establish a communication network with various remote controllers 200 to receive control signals related to the operation of the image display device 100 from the remote controllers 200 or to transmit data related to the operation of the image display device 100 to the remote controllers 200.

The A/V input/output unit may receive image and audio signals from the external device.

The external device interface 130 may include a wireless communicator (not shown) for short-range wireless communication with other electronic devices.

The external device interface 130 may exchange data with a neighboring mobile terminal through the wireless communicator (not shown). Particularly, the external device interface 130 may receive device information, information on an application that is being executed, and an application image from the mobile terminal in a mirroring mode.

The network interface 135 may provide an interface to connect the image display device 100 to a wired/wireless network including the Internet. For example, the network interface 135 may receive content or data provided over the Internet or from a content provider or a network provider over a network.

The network interface 135 may include a communication module (not shown) for connection to a wired/wireless network.

The external device interface 130 and/or the network interface 135 may include a communication module for short-range communication, such as Wireless Fidelity (Wi-Fi), Bluetooth, Bluetooth Low Energy (BLE), ZigBee, or Nearfield Communication (NFC), and a communication module for cellular communication, such as Long-Term Evolution (LTE), LTE Advanced (LTE-A), Code Division Multiple Access (CDMA), wideband CDMA (WCDMA), Universal Mobile Telecommunications System (UMTS), or Wireless Broadband (WiBro).

The external device interface 130 may include a first wireless communication module 131 and a second wireless communication module 132 for wirelessly transmitting and receiving data to and from other image display devices disposed adjacent thereto.

The first wireless communication module 131 and the second wireless communication module 132 may transmit and receive signals through the same short-range communication method.

The first wireless communication module 131 and the second wireless communication module 132 may transmit and receive signals using a frequency band of 57 GHz to 71 GHz. In this case, the frequency bandwidth used by the first wireless communication module 131 and the second wireless communication module 132 may be 7 GHz or less. For example, the first wireless communication module 131 and the second wireless communication module 132 may transmit and receive signals using a frequency bandwidth of 7 GHz.

Accordingly, the image display device 100 including the first wireless communication module 131 and the second wireless communication module 132 may rapidly transmit and receive a large amount of data to and from other image display devices disposed adjacent thereto. For example, the image display device 100 may transmit and receive data to and from other image display devices disposed adjacent thereto at a transmission speed of 6 gigabits per second (Gbps).

The first wireless communication module 131 and the second wireless communication module 132 may be respectively disposed on one surface and the opposite surface of a housing (not shown) of the image display device 100.

For example, the first wireless communication module 131 may be disposed on one surface of the housing, and the second wireless communication module 132 may be disposed on the opposite surface of the housing. In this case, the second wireless communication module 132 may be disposed at a position on the opposite surface of the housing corresponding to the position of the first wireless communication module 131.

Each of the first wireless communication module 131 and the second wireless communication module 132 may include a transmission antenna (not shown) and a reception antenna (not shown).

In this case, the transmission antenna of the first wireless communication module 131 may be disposed at a position corresponding to the position of the reception antenna of the second wireless communication module 132, and the reception antenna of the first wireless communication module 131 may be disposed at a position corresponding to the position of the transmission antenna of the second wireless communication module 132.

Each of the first wireless communication module 131 and the second wireless communication module 132 may further include at least one shielding member (not shown) disposed between the transmission antenna and the reception antenna. In this case, the shielding member may be made of a material having a high loss tangent in order to prevent a signal reception rate from being lowered by transmission of a noise signal to the reception antenna due to crosstalk. Here, the loss tangent is an index indicating the amount of a signal that is lost in a dielectric when the signal is transmitted through the dielectric. The smaller the loss tangent, the less of the signal is lost.

The at least one shielding member may be formed so as to surround at least a portion of at least one of the transmission antenna or the reception antenna.

The storage 140 may store therein a program for processing and controlling each signal in the controller 170, and may store therein the processed image, audio or data signal.

For example, the storage 140 may store therein applications designed for the purpose of performing various tasks that can be processed by the controller 170, and may selectively provide some of the stored applications in response to the request from the controller 170.

The program stored in the storage 140 is not limited to any specific program, so long as it is capable of being executed by the controller 170.

The storage 140 may temporarily store the image, audio or data signal received from the external device through the external device interface 130.

The storage 140 may store information on predetermined broadcast channels through a channel memory function such as a channel map.

Although FIG. 2 illustrates an embodiment in which the storage 140 is provided separately from the controller 170, the disclosure is not limited thereto. The storage 140 may be included in the controller 170.

The storage 140 may include at least one of volatile memory (e.g. DRAM, SRAM, or SDRAM) or nonvolatile memory (e.g. flash memory, hard disk drive (HDD), or solid-state drive (SSD)).

The user input interface 150 may transmit a signal input by the user to the controller 170, or may transmit a signal from the controller 170 to the user.

For example, the user input interface 150 may receive a signal input by the user, such as power on/off, channel selection, or screen setting, from the remote controller 200, or may receive a signal input by the user through a local key (not shown) such as a power key, a channel key, a volume key, or a setting key to transmit the signal input by the user to the controller 170. Also, the user input interface 150 may receive a signal input by the user from a sensor, which senses gestures of the user, to transmit the signal input by the user to the controller 170, or may transmit a signal from the controller 170 to the sensor.

The input unit 160 may be provided on one side of the main body of the image display device 100. For example, the input unit 160 may include a touch pad, a physical button, and the like.

The input unit 160 may receive various user commands related to the operation of the image display device 100, and may transmit control signals corresponding to the received commands to the controller 170.

The controller 170 may include at least one processor, and may control the overall operation of the image display device 100 using the processor included therein. Here, the processor may be a general processor such as a central processing unit (CPU). Of course, the processor may be a dedicated device such as an application-specific integrated circuit (ASIC), or may be any of other hardware-based processors.

The controller 170 may demultiplex stream signals input through the tuner 110, the demodulator 120, the external device interface 130, or the network interface 135, or may process the demultiplexed signals to generate and output signals for image or sound output.

The display 180 may convert an image signal, a data signal, an on-screen display (OSD) signal, or a control signal processed by the controller 170 or an image signal, a data signal, or a control signal received from the external device interface 130 to generate a driving signal.

The display 180 may include a display panel (not shown) having a plurality of pixels.

The plurality of pixels provided in the display panel may include RGB subpixels. Alternatively, the plurality of pixels provided in the display panel may include RGBW subpixels. The display 180 may convert an image signal, a data signal, an OSD signal, or a control signal processed by the controller 170 to generate signals for driving the plurality of pixels.

The display 180 may be implemented as a plasma display panel (PDP) display, a liquid crystal display (LCD), an organic light-emitting diode (OLED) display, or a flexible display, or may also be implemented as a three-dimensional display (3D display). The 3D display 180 may be classified into a non-glasses type and a glasses type.

Further, the display 180 may be implemented as a touch screen, and thus may be used not only as an output device but also as an input device.

The audio output unit 185 may receive an audio signal processed by the controller 170 and may output a sound based thereon.

The image signal processed by the controller 170 may be input to the display 180, and the display 180 may display an image corresponding to the received image signal. Further, the image signal processed by the controller 170 may be input to an external output device through the external device interface 130.

The audio signal processed by the controller 170 may be output in the form of a sound through the audio output unit 185. In addition, the audio signal processed by the controller 170 may be input to the external output device through the external device interface 130.

Although not illustrated in FIG. 2, the controller 170 may include a demultiplexer and an image processor. This will be described later with reference to FIG. 3.

The controller 170 may control the overall operation of the image display device 100.

For example, the controller 170 may control the tuner 110 so that the tuner 110 tunes a broadcast signal corresponding to a channel selected by the user or a pre-stored channel.

In addition, the controller 170 may control the image display device 100 in response to a command input by the user through the user input interface 150 or according to an internal program.

The controller 170 may control the display 180 to display an image. The image displayed on the display 180 may be a still image or a video, and may be a 2D image or a 3D image.

The controller 170 may perform control such that a predetermined 2D object is displayed in the image displayed on the display 180. For example, the object may be at least one of a connected web screen (e.g. newspaper or magazine), an electronic program guide (EPG), various menus, widgets, icons, a still image, a video, or text.

The controller 170 may modulate and/or demodulate a signal using an amplitude shift keying (ASK) method. The amplitude shift keying (ASK) method may be a method of modulating a signal by varying the amplitude of a carrier wave depending on a data value or restoring an analog signal to a digital data value depending on the amplitude of a carrier wave.

For example, the controller 170 may modulate an image signal using the amplitude shift keying (ASK) method, and may transmit the modulated image signal to the first wireless communication module 131 and to the second wireless communication module 132.

For example, the controller 170 may demodulate and process an image signal received through the first wireless communication module 131 and the second wireless communication module 132 using the amplitude shift keying (ASK) method.

The image display device 100 may further include a signal modulation/demodulation unit (not shown) for modulating and/or demodulating a signal. In this case, the signal modulation/demodulation unit may be included in, for example, the first wireless communication module 131 and the second wireless communication module 132.

Accordingly, the image display device 100 may conveniently transmit and receive a signal to and from other image display devices disposed adjacent thereto without using a unique identifier such as a media access control (MAC) address or a complicated communication protocol such as TCP/IP.

The image display device 100 may further include a photographing unit (not shown). The photographing unit may photograph the user. The photographing unit may be implemented as one camera, without being limited thereto. The photographing unit may be implemented as a plurality of cameras. The photographing unit may be embedded in the image display device 100 at a position above the display 180, or may be disposed separately from the image display device 100. Information on an image captured by the photographing unit may be input to the controller 170.

The controller 170 may recognize the location of the user based on an image captured by the photographing unit. For example, the controller 170 may determine the distance (z-axis coordinate) between the user and the image display device 100. In addition, the controller 170 may determine the x-axis coordinate and the y-axis coordinate in the display 180 that correspond to the location of the user.

The controller 170 may sense the gesture of the user based on an image captured by the photographing unit, a signal sensed by the sensor, or a combination thereof.

The power supply 190 may supply corresponding power over the entire image display device 100. In particular, the power supply 190 may supply power to the controller 170, which may be implemented in a system-on-chip (SOC) form, to a display 180 for displaying an image, and to an audio output unit 185 for outputting a sound.

Specifically, the power supply 190 may include a converter (not shown) for converting alternating-current (AC) power to direct-current (DC) power and a DC/DC converter (not shown) for converting the level of the DC power.

The power supply 190 may include a power input unit 191 and a power output unit 192.

The power input unit 191 may receive power (e.g. commercial power) supplied from the outside of the image display device 100. The power input unit 191 may include an input connector (not shown) connected to an external device that supplies power.

The power output unit 192 may transmit power to the outside of the image display device 100. The power output unit 192 may include an output connector (not shown) connected to an external device, which is the target to which power is to be supplied.

In this case, one of the input connector and the output connector may be disposed so as to protrude to a predetermined height from the housing, and the other one thereof may be disposed in a recessed portion that is recessed to a predetermined depth in the housing.

The power output unit 192 and the power input unit 191 may be respectively disposed on one surface and the opposite surface of the housing (not shown) of the image display device 100.

For example, the power output unit 192 may be disposed on one surface of the housing, and the power input unit 191 may be disposed at a position on the opposite surface of the housing corresponding to the position of the power input unit 191.

The remote controller 200 may transmit user input to the user input interface 150. To this end, the remote controller 200 may operate using Bluetooth, radio frequency (RF) communication, infrared radiation communication, Ultra-WideBand (UWB), or ZigBee. In addition, the remote controller 200 may receive an image, audio, or data signal output from the user input interface 150, and may output the received signal in the form of an image or a sound.

The above-described image display device 100 may be a fixed-type or mobile-type digital broadcast receiver capable of receiving digital broadcast signals.

The block diagram of the image display device 100 illustrated in FIG. 2 merely describes one exemplary embodiment of the present disclosure. Depending on the specifications of the image display device 100 that is actually implemented, the components shown in the block diagram may be combined or omitted, or new components may be added.

That is, as needed, two or more components of the image display device 100 may be combined into one component, or one component thereof may be separated into two or more components. The functions performed by each block merely describe one exemplary embodiment of the present disclosure, and the specific operation or configuration thereof does not restrict the scope of the present disclosure.

Figure 3:
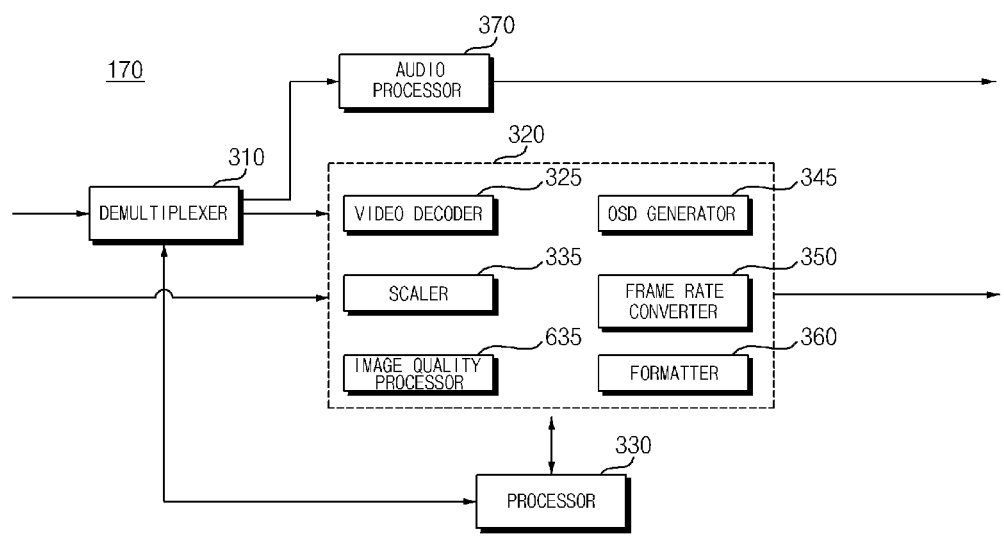
FIG. 3 is a block diagram of the internal configuration of the controller of FIG. 2.

FIG. 3 is a block diagram of the internal configuration of the controller of FIG. 2.

Referring to FIG. 3, the controller 170 according to an exemplary embodiment of the present disclosure may include a demultiplexer 310, an image processor 320, a processor 330, and/or an audio processor 370. The controller 170 may further include a data processor (not shown).

The demultiplexer 310 may demultiplex a stream signal that is input thereto. For example, the demultiplexer 310 may demultiplex an MPEG-2 TS into image, audio, and data signals. The stream signal input to the demultiplexer 310 may be a stream signal that is output from the tuner 110, the demodulator 120, or the external device interface 130.

The image processor 320 may perform signal processing on an image that is input thereto. For example, the image processor 320 may perform image processing on an image signal demultiplexed by the demultiplexer 310.

To this end, the image processor 320 may include a video decoder 325, a scaler 335, an image quality processor 635, a video encoder (not shown), an OSD generator 340, a frame rate converter 350, and/or a formatter 360.

The video decoder 325 may decode the demultiplexed image signal, and the scaler 335 may scale the resolution of the decoded image signal so that the image signal may be output from the display 180.

The video decoder 325 may be provided with decoders that operate in conformance with various standards. For example, the video decoder 325 may include an MPEG-2 decoder, an H.264 decoder, a 3D video decoder for a color image and a depth image, and a decoder for multi-view images.

The scaler 335 may scale a received image signal, which has been completely decoded by the video decoder 325.

For example, when the size or resolution of a received image signal is small or low, the scaler 335 may upscale the received image signal. When the size or resolution of a received image signal is larger or high, the scaler 335 may downscale the received image signal.

The image quality processor 635 may perform image-quality processing on a received image signal, which has been completely decoded by the video decoder 325.

For example, the image quality processor 635 may remove noise of a received image signal, may expand the luminance gradation of a received image signal, may enhance an image resolution, may perform high dynamic range (HDR)-based signal processing, may change a frame rate, or may perform image-quality processing corresponding to the characteristics of a panel, particularly an organic light-emitting panel.

The OSD generator 340 may generate an OSD signal automatically or in response to user input. For example, the OSD generator 340 may generate signals by which various pieces of information are displayed in the form of a graphic or a text on the screen of the display 180 based on user input signals. The OSD signal generated by the OSD generator 340 may include various data such as a user interface screen of the image display device 100, various menu screens, widgets, and icons. In addition, the OSD signal generated by the OSD generator 340 may include a 2D object or a 3D object.

Further, the OSD generator 340 may generate a pointer to be displayed on the display 180 based on a pointing signal received from the remote controller 200. Particularly, the pointer may be generated by a pointing controller (not shown). The pointing controller may be included in the OSD generator 240. Of course, the pointing controller (not shown) may not be included in the OSD generator 240, but may be provided separately from the OSD generator 240.

The frame rate converter (FRC) 350 may convert the frame rate of a received image. Alternatively, the FRC 350 may simply output a received image without separately converting the frame rate thereof.

The formatter 360 may change the format of a received image signal, and may output the changed image signal so that the image signal is displayed on the display 180.

Particularly, the formatter 360 may change the format of a received image signal to correspond to the characteristics of the display panel.

The processor 330 may control the overall operation of the image display device 100 or the controller 170.

For example, the processor 330 may control the tuner 110 to tune an RF broadcast signal corresponding to a channel selected by the user or a pre-stored channel.

Further, the processor 330 may control the image display device 100 in response to a command input by the user through the user input interface 150 or according to an internal program.

Furthermore, the processor 330 may control transmission of data through the network interface 135 or the external device interface 130.

Furthermore, the processor 330 may control the operation of the demultiplexer 310 and the image processor 320 of the controller 170.

The audio processor 370 of the controller 170 may process the demultiplexed audio signal. To this end, the audio processor 370 may include various decoders.

Further, the audio processor 370 of the controller 170 may adjust the bass, treble, and volume of a sound.

The data processor (not shown) of the controller 170 may process the demultiplexed data signal. For example, when the demultiplexed data signal is a coded data signal, the data processor may decode the coded data signal. The coded data signal may be electronic program guide information, which includes broadcasting information such as a starting time or an ending time of a scheduled broadcast program of each channel.

The block diagram of the controller 170 illustrated in FIG. 3 merely describes one exemplary embodiment of the present disclosure. Depending on the specifications of the controller 170 that is actually implemented, the components shown in the block diagram may be combined or omitted, or new components may be added.

Particularly, the FRC 350 and the formatter 360 may be provided separately from the image processor 320.

Figure 4A:
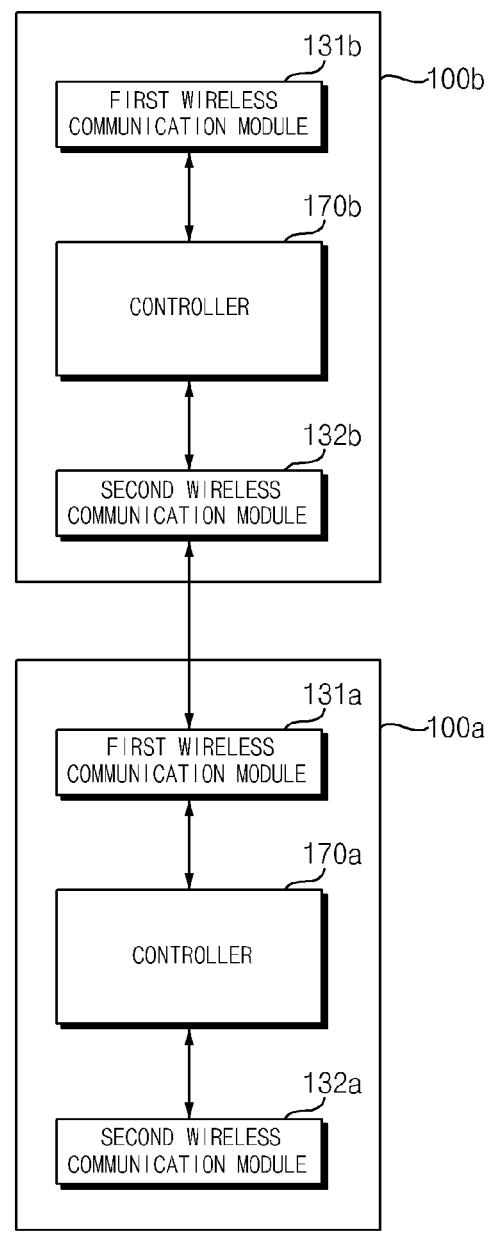
FIGS. 4A and 4B are diagrams illustrating transmission of data between a plurality of image display devices.
Figure 4B:
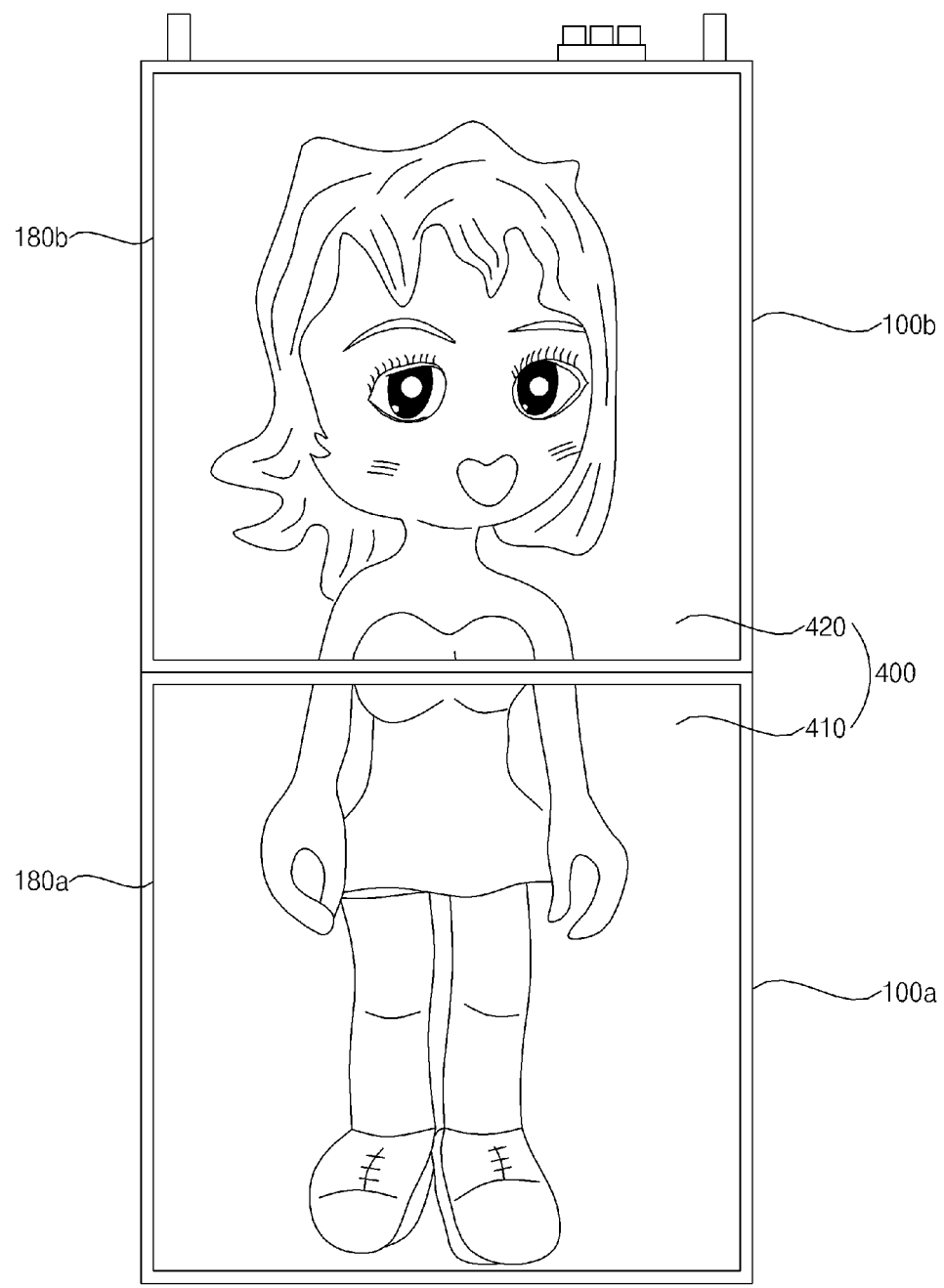

FIGS. 4A and 4B are diagrams illustrating transmission of data between a plurality of image display devices.

Referring to FIGS. 4A and 4B, the first image display device 100*a* may transmit and receive image signals to and from the second image display device 100*b* disposed adjacent thereto. For example, the first image display device 100*a* and the second image display device 100*b* may be disposed such that one surface of the housing of the first image display device 100*a* and the opposite surface of the housing of the second image display device 100*b* are in contact with each other.

The first image display device 100*a* may transmit an image signal to the second image display device 100*b* through the first wireless communication module 131*a*, which is disposed on one surface of the housing of the first image display device 100*a*. The second image display device 100*b* may receive an image signal from the first image display device 100*a* through the second wireless communication module 132*b*, which is disposed on the opposite surface of the housing of the second image display device 100*b*.

In this case, the first image display device 100*a* and the second image display device 100*b* may be disposed such that the first wireless communication module 131*a* of the first image display device 100*a* and the second wireless communication module 132*b* of the second image display device 100*b* are disposed adjacent to each other so as to face each other.

For example, the first image display device 100*a* and the second image display device 100*b* may be disposed such that the transmission antenna included in the first wireless communication module 131*a* of the first image display device 100*a* and the reception antenna included in the second wireless communication module 132*b* of the second image display device 100*b* face each other and such that the reception antenna included in the first wireless communication module 131*a* of the first image display device 100*a* and the transmission antenna included in the second wireless communication module 132*b* of the second image display device 100*b* face each other.

The first image display device 100*a* and the second image display device 100*b* may respectively output portions 410 and 420 of the entire image 400 through the displays 180*a* and 180*b*.

In this case, the first image display device 100*a* may transmit an image signal including all of the data on the entire image 400 to the second image display device 100*b*. The controller 170*b* of the second image display device 100*b* may extract a portion of the data on the entire image 400 received from the first image display device 100*a*, and may output the portion 420 of the image.

FIGS. 5A to 8B are views illustrating examples of the image display device of FIG. 1.

Figure 5A:
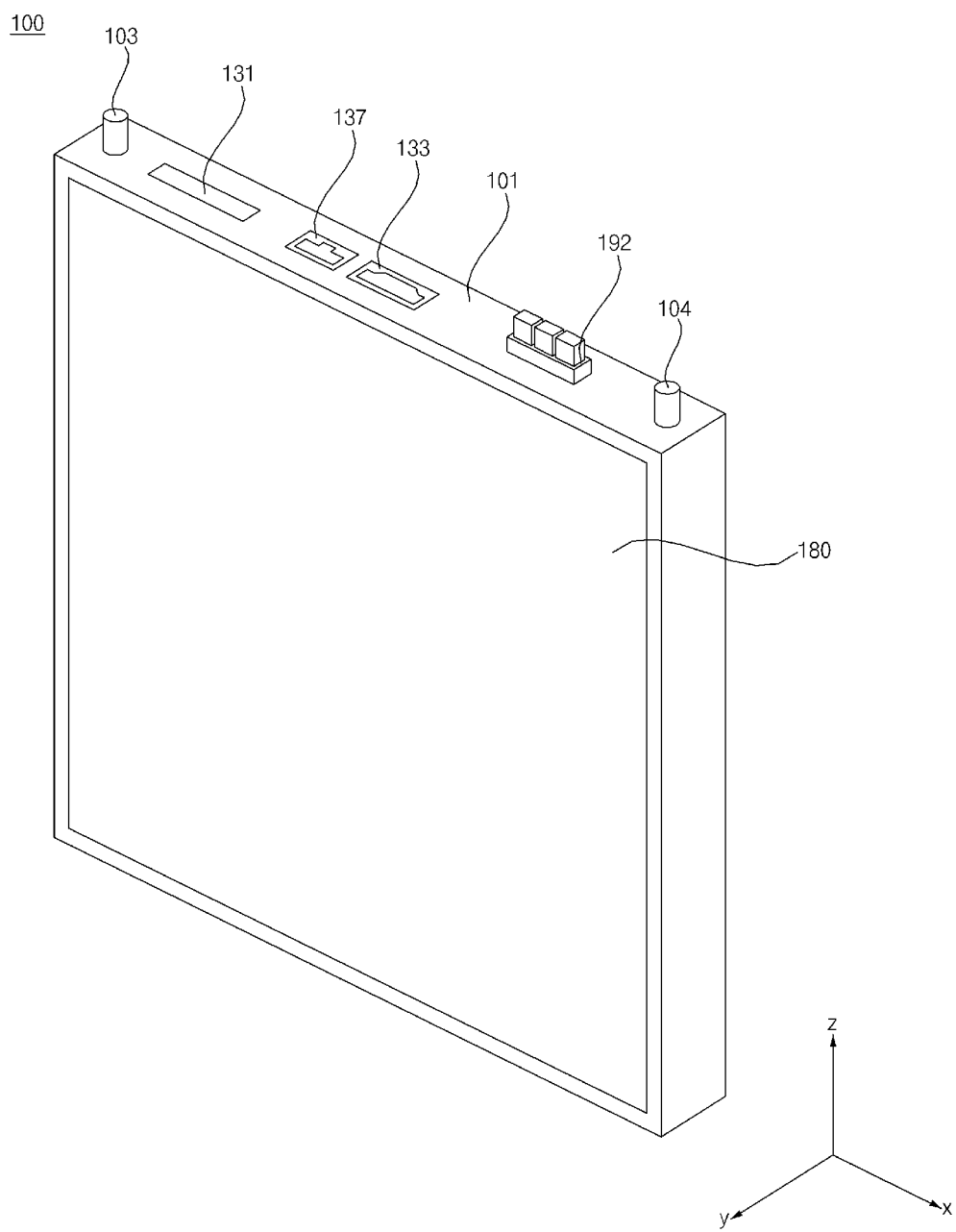
FIGS. 5A, 5B, 5C, 5D, 5E, 6A, 6B, 7A, 7B, 8A to 8B are views illustrating examples of the image display device of FIG. 1.
Figure 5B:
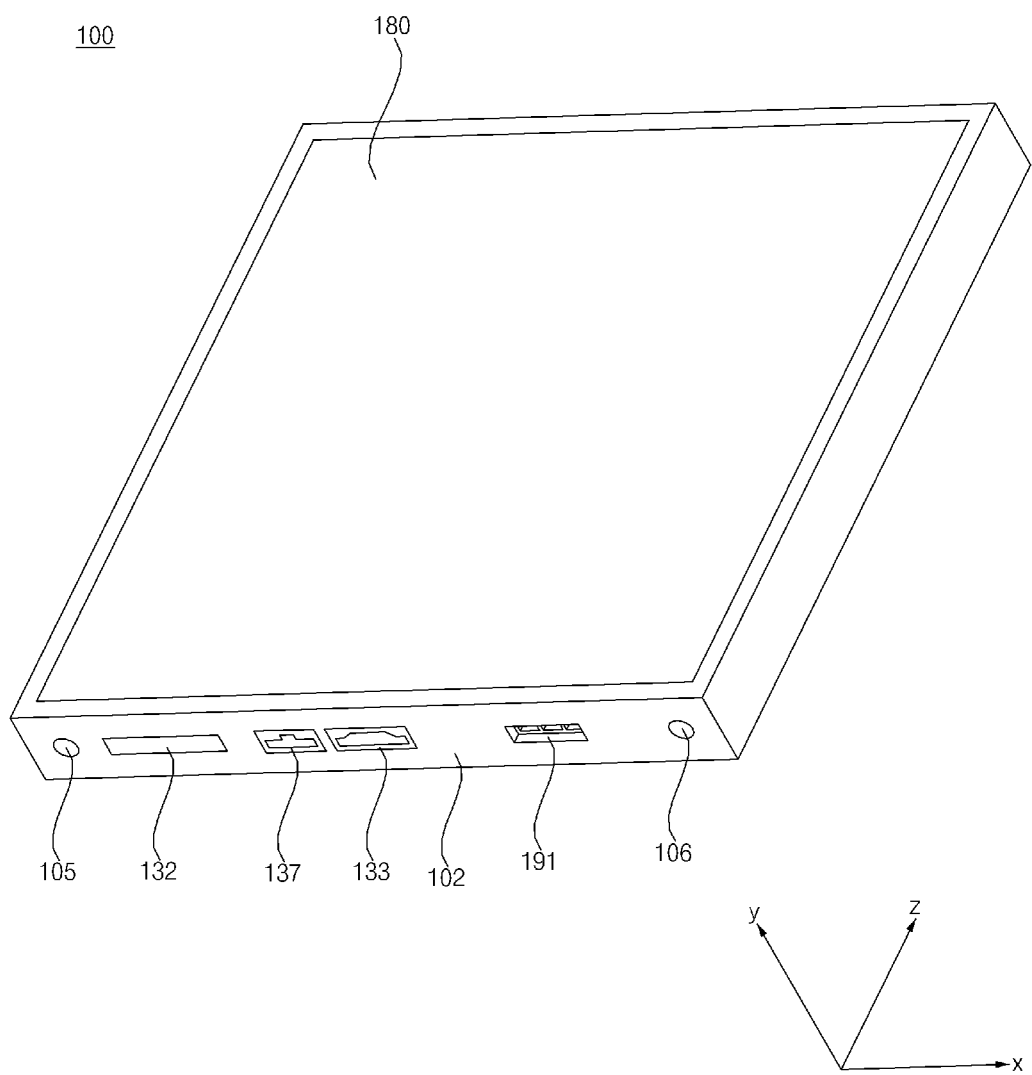
Figure 5C:
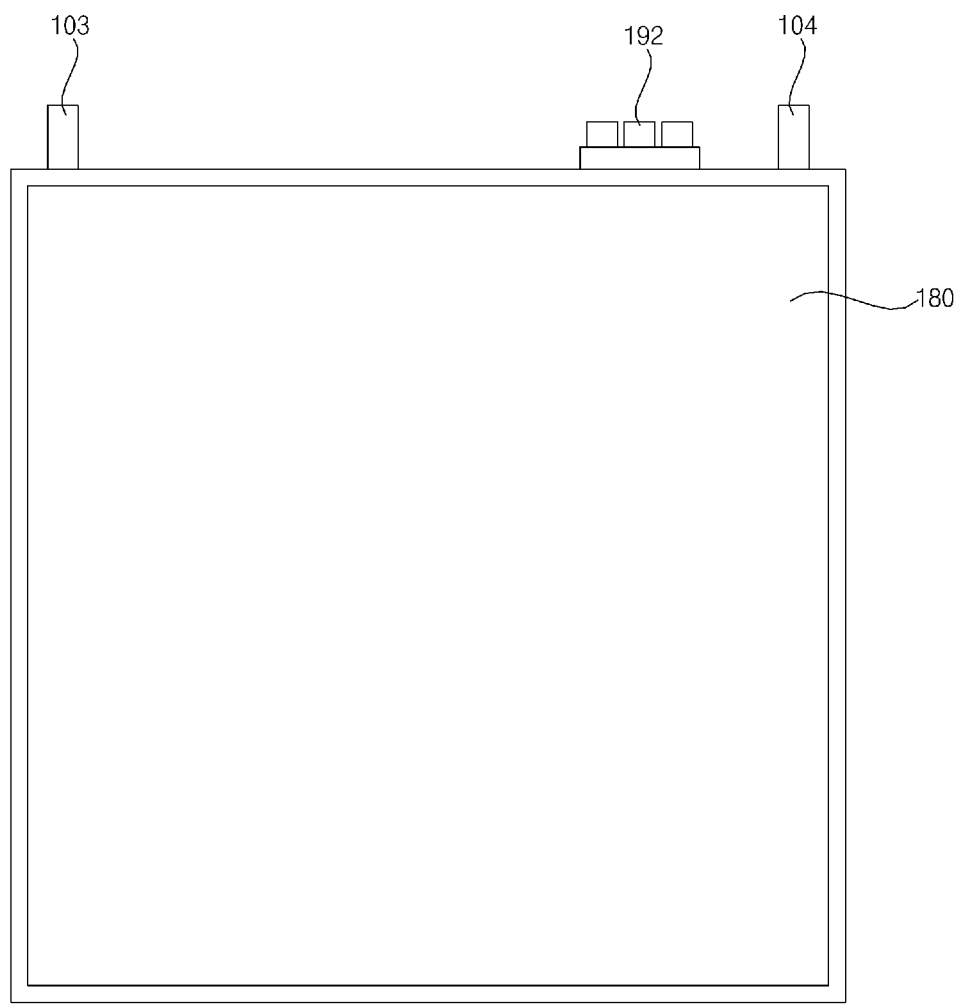
Figure 5D:
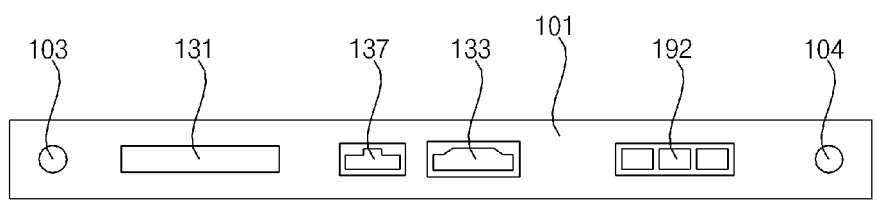
Figure 5E:
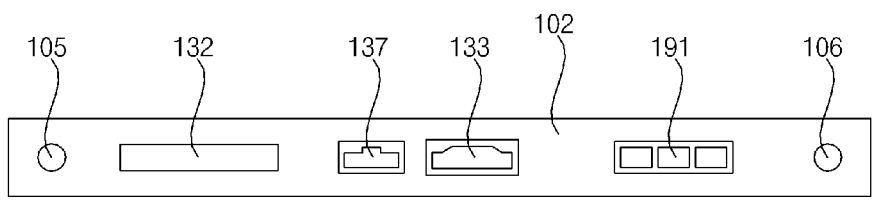

FIG. 5A is a perspective view of the image display deice 100 when viewed in one direction, FIG. 5B is a perspective view of the image display device 100 when viewed in the opposite direction, FIG. 5C is a front view of the image display device 100, FIG. 5D is a plan view of the image display device 100, and FIG. 5E is a bottom view of the image display device 100.

Referring to FIGS. 5A to 5E, a first wireless communication module 131, an HDMI terminal 133, a network cable terminal 137, and/or a power output unit 192 may be disposed on one surface 101 of the housing of the image display device 100.

A second wireless communication module 132, an HDMI terminal 133, a network cable terminal 137, and/or a power input unit 191 may be disposed on the opposite surface 102 of the housing of the image display device 100.

In this case, the position on the one surface 101 of the housing at which the first wireless communication module 131 is disposed and the position on the opposite surface 102 of the housing at which the second wireless communication module 132 is disposed may correspond to each other.

Further, the position on the one surface 101 of the housing at which the power output unit 192 is disposed and the position on the opposite surface 102 of the housing at which the power input unit 191 is disposed may correspond to each other.

Although it is illustrated in the drawings that the power input unit 191 is disposed in a recessed portion that is recessed to a predetermined depth in the opposite surface 102 of the housing and the power output unit 192 is disposed so as to protrude to a predetermined height from the one surface 101 of the housing, the disclosure is not limited thereto.

The shape of the power input unit 191 and the shape of the power output unit 192 may be formed so as to be engaged with each other.

Coupling protrusions 103 and 104 may be formed on the one surface 101 of the housing of the image display device 100 so as to protrude to a predetermined height from the housing.

Recesses 105 and 106 may be formed in the opposite surface 102 of the housing of the image display device 100 so as to be recessed to a predetermined depth in the housing.

The shapes of the coupling protrusions 103 and 104 and the shapes of the recesses 105 and 106 may be formed so as to be engaged with each other.

The positions on the one surface 101 of the housing at which the coupling protrusions 103 and 104 are disposed and the positions on the opposite surface 102 of the housing at which the recesses 105 and 106 are disposed may correspond to each other. Although it is illustrated in the drawings that the coupling protrusions 103 and 104 are formed on the one surface 101 of the housing and the recesses 105 and 106 are formed in the opposite surface 102 of the housing, the disclosure is not limited thereto.

Figure 6A:
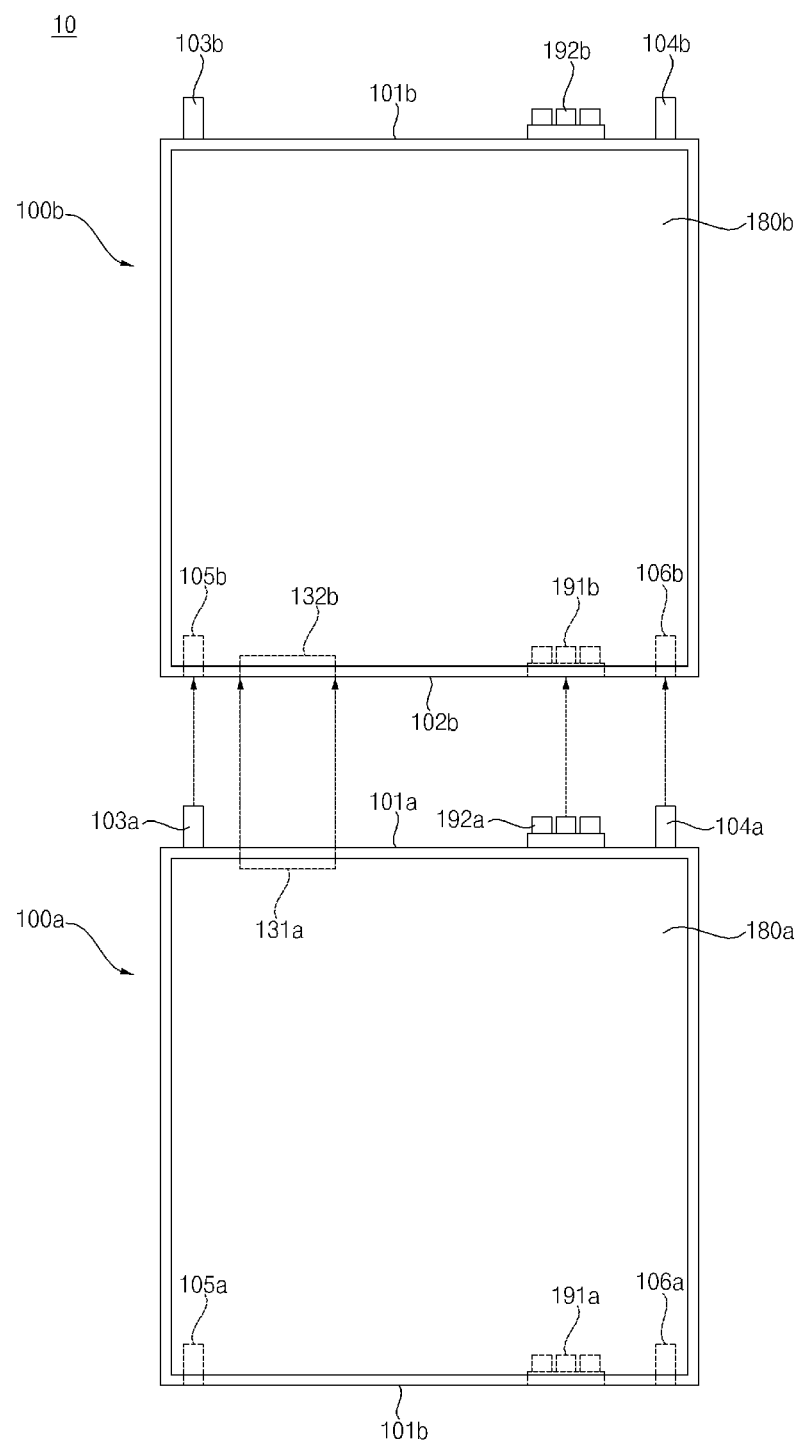
Figure 6B:
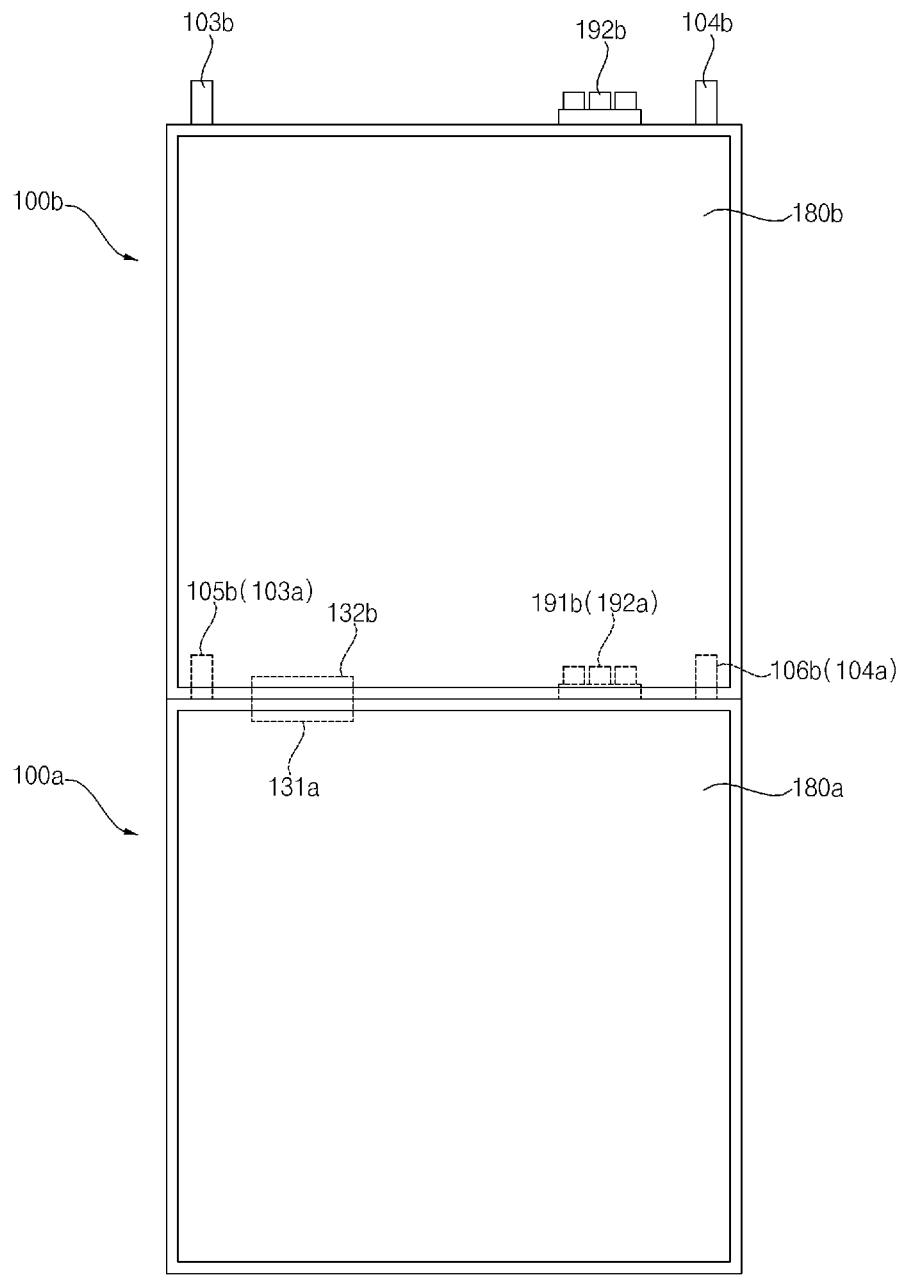

Referring to FIGS. 6A and 6B, the first image display device 100a and the second image display device 100b may be disposed such that one surface 101a of the housing of the first image display device 100a and the opposite surface 102b of the housing of the second image display device 100b are disposed adjacent to each other.

In this case, coupling protrusions 103a and 104a formed on the one surface 101a of the housing of the first image display device 100a may be respectively inserted into recesses 105b and 106b formed in the opposite surface 102b of the housing of the second image display device 100b.

In addition, a power output unit 192a disposed on the one surface 101a of the housing of the first image display device 100a may be inserted into a power input unit 191b disposed on the opposite surface 102b of the housing of the second image display device 100b.

The first image display device 100a may supply power to the power input unit 191b of the second image display device 100b through the power output unit 192a, and the second image display device 100b may operate using the power received through the power input unit 191b.

Further, the first wireless communication module 131a disposed on the one surface 101a of the housing of the first image display device 100a and the second wireless communication module 132b disposed on the opposite surface 102b of the housing of the second image display device 100b may be disposed adjacent to each other so as to face each other. This will be described with reference to FIGS. 7A to 8B.

Figure 7A:
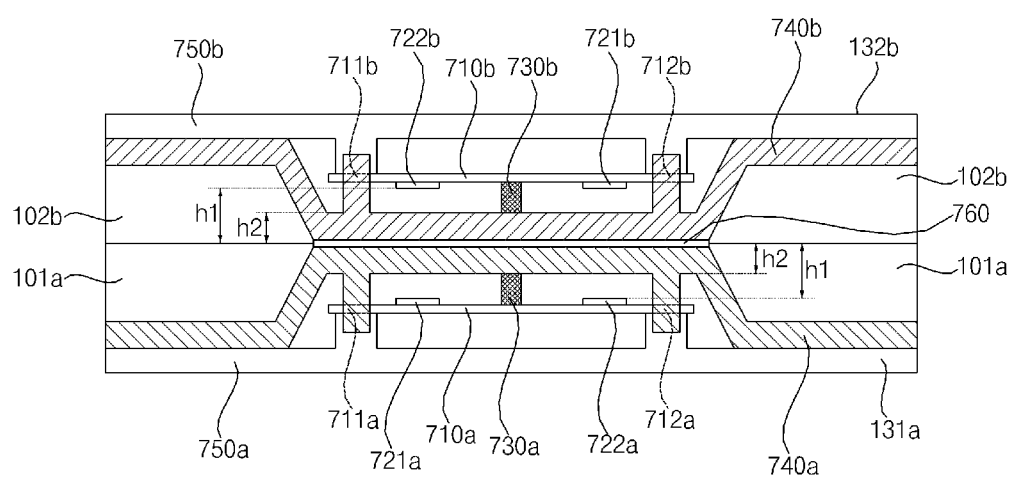
Figure 7B:
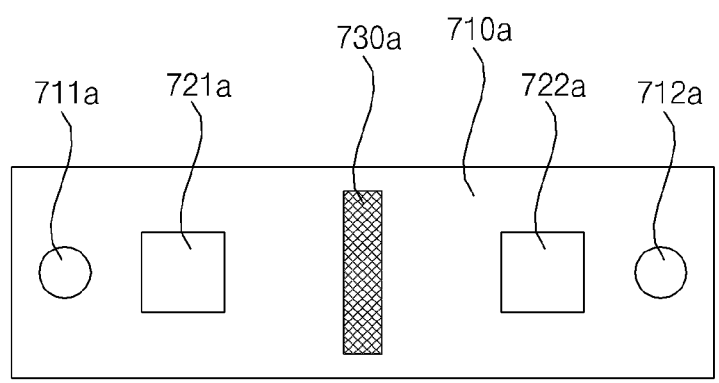

Referring to FIGS. 7A and 7B, the one surface 101a of the housing of the first image display device 100a and the opposite surface 102b of the housing of the second image display device 100b may be in contact with each other.

The first wireless communication module 131a of the first image display device 100a may include a transmission antenna 721a and a reception antenna 722a mounted on a printed circuit board 710a.

The first wireless communication module 131a of the first image display device 100a may further include a shielding member 730a disposed between the transmission antenna 721a and the reception antenna 722a.

In this case, the vertical distance h2 between the one surface 101a of the housing of the first image display device 100a and the shielding member 730a may be shorter than the vertical distance h1 between the one surface 101a of the housing of the first image display device 100a and the transmission and reception antennas 721a and 722a.

The first wireless communication module 131a of the first image display device 100a may further include a protective member 740a.

The protective member 740a may be disposed between the transmission and reception antennas 721a and 722a and the outer side of the housing of the first image display device 100a. That is, the transmission antenna 721a and the reception antenna 722a may be disposed inside the housing of the first image display device 100a, and the protective member 740a may be disposed so that the transmission antenna 721a and the reception antenna 722a are shielded from the outside of the housing.

The protective member 740a may be disposed in contact with the shielding member 730a. The loss tangent of the shielding member 730a may be greater than the loss tangent of the protective member 740a. For example, the protective member 740a may be formed of a synthetic material of polycarbonate (PC) and acrylonitrile-butadiene-styrene (ABS).

A plurality of through-holes 711a and 712a may be formed in the printed circuit board 710a so as to penetrate the printed circuit board 710a from the front surface thereof to the rear surface thereof. The protective member 740a may be inserted into the plurality of through-holes 711a and 712a.

The first wireless communication module 131a of the first image display device 100a may further include a fixing member 750a.

The fixing member 750a may be disposed in contact with the protective member 740a and/or the printed circuit board 710a. The protective member 740a and/or the printed circuit board 710a may be fixed to the fixing member 750a using fastening members such as bolts and nuts.

The second wireless communication module 132b of the second image display device 100b may include transmission and reception antennas 721b and 722b, which are mounted on a printed circuit board 710b, a shielding member 730b, a protective member 740, and/or a fixing member 750b, and may be configured identically or similarly to the first wireless communication module 131a of the first image display device 100a.

When the one surface 101a of the housing of the first image display device 100a and the opposite surface 102b of the housing of the second image display device 100b are in contact with each other, the first wireless communication module 131a of the first image display device 100a and the second wireless communication module 132b of the second image display device 100b may be disposed adjacent to each other so as to face each other.

In this case, the transmission antenna 721a of the first wireless communication module 131a of the first image display device 100a and the reception antenna 722b of the second wireless communication module 132b of the second image display device 100b may be disposed so as to face each other, and the reception antenna 722a of the first wireless communication module 131a of the first image display device 100a and the transmission antenna 721b of the second wireless communication module 132b of the second image display device 100b may be disposed so as to face each other.

The first image display device 100a may transmit signals to the reception antenna 722b of the second wireless communication module 132b of the second image display device 100b through the transmission antenna 721a of the first wireless communication module 131a.

The second image display device 100b may transmit signals to the reception antenna 722a of the first wireless communication module 131a of the first image display device 100a through the transmission antenna 721b of the second wireless communication module 132b.

When the one surface 101a of the housing of the first image display device 100a and the opposite surface 102b of the housing of the second image display device 100b are brought into contact with each other, an air gap 760 may be formed between the protective member 740a of the first wireless communication module 131a of the first image display device 100a and the protective member 740b of the second wireless communication module 132b of the second image display device 100b. Accordingly, damage to the protective members 740a and 740b may be prevented, thereby maintaining signal transmission efficiency.

Figure 8A:
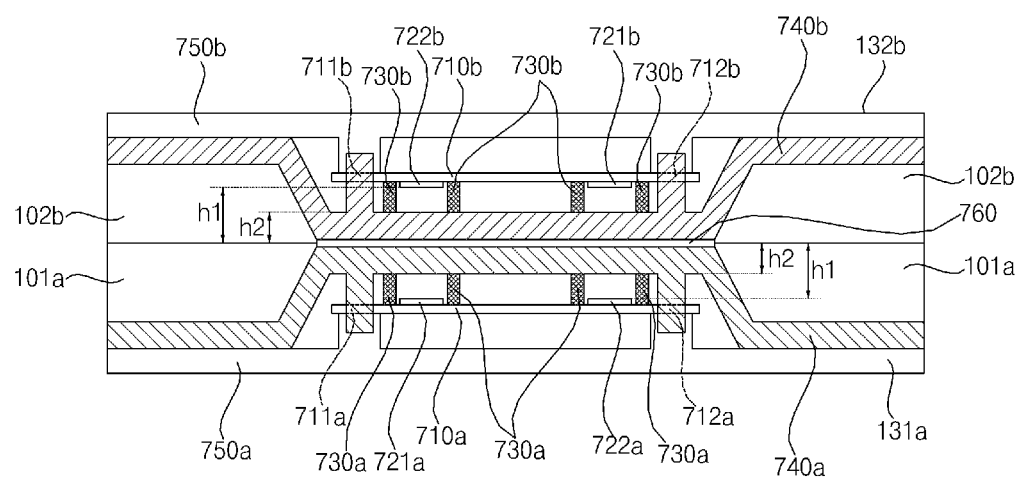
Figure 8B:
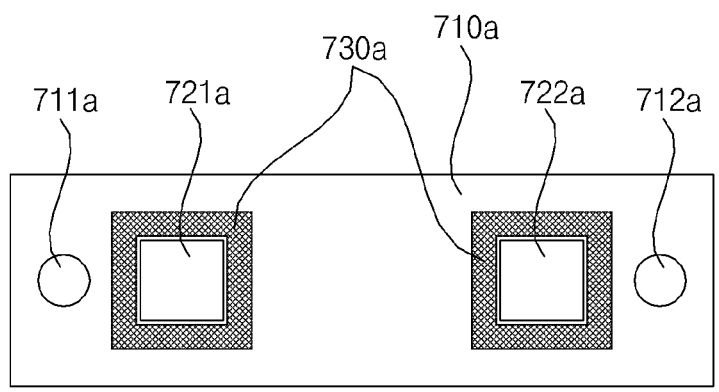

Referring to FIGS. 8A and 8B, the first wireless communication module 131a of the first image display device 100a may include a plurality of shielding members 730a disposed between the transmission antenna 721a and the reception antenna 722a.

In this case, the plurality of shielding members 730a may be formed so as to surround each of the transmission antenna 721a and the reception antenna 722a so that the noise-signal-blocking performance is improved.

Although it is illustrated in the drawings that a plurality of shielding members 730a is formed so as to surround the entirety of the transmission antenna 721a and the entirety of the reception antenna 722a, the disclosure is not limited thereto. The plurality of shielding members 730a may be formed so as to surround at least a portion of the transmission antenna 721a and at least a portion of the reception antenna 722a, including the region between the transmission antenna 721a and the reception antenna 722a.

The second wireless communication module 132b of the second image display device 100b may also include a plurality of shielding members 730b formed so as to surround each of the transmission antenna 721b and the reception antenna 722b.

As described above, according to various embodiments of the present disclosure, the plurality of image display devices 100 may transmit and receive data rapidly and conveniently using short-range wireless communication therebetween without connection of cables for transmitting or receiving data, thereby improving convenience in installation of the digital wall.

In addition, the shielding member is mounted in consideration of a loss tangent, thereby preventing a signal reception rate from being lowered by crosstalk, thus increasing data transmission efficiency.

As is apparent from the above description, the image display device and the digital wall according to the present disclosure have the following effects.

According to at least one embodiment of the present disclosure, rapid and convenient transmission and reception of data may be realized using short-range wireless communication without connection of cables for transmitting or receiving data, thereby improving convenience in installation of the digital wall.

In addition, according to at least one embodiment of the present disclosure, data transmission efficiency may be improved by reducing noise attributable to crosstalk when wirelessly transmitting and receiving data.

Since the accompanying drawings are merely for easily understanding embodiments disclosed herein, it should be understood that the technical spirit disclosed herein is not limited by the accompanying drawings, and all changes, equivalents or substitutions are included in the spirit and technical scope of the present disclosure.

Likewise, although operations are shown in a specific order in the drawings, it should not be understood that the operations are performed in the specific order shown in the drawings or in a sequential order so as to obtain desirable results, or all operations shown in the drawings are performed. In certain cases, multitasking and parallel processing may be advantageous.

Although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

What is claimed is:

1. An image display device comprising:
a housing;
a display configured to display an image;
a first wireless communication module disposed on one surface of the housing; and
a second wireless communication module disposed at a position on an opposite surface of the housing corresponding to a position of the first wireless communication module,
wherein each of the first wireless communication module and the second wireless communication module comprises:
a printed circuit board;

a transmission antenna and a reception antenna mounted on the printed circuit board;
a plurality of shielding members disposed on the printed circuit board to surround each of the transmission antenna and the reception antenna; and
a protective member in contact with the plurality of shielding members,
wherein a first protective member in the first wireless communication module is disposed at a position recessed by a predetermined depth from the one surface of the housing,
wherein a second protective member in the second wireless communication module is disposed at a position recessed by the predetermined depth from the opposite surface of the housing such that an gap is formed between the first protective member and the second protective member when the one surface of the housing and the opposite surface of the housing are brought in contact with each other.

2. The image display device according to claim 1, wherein a height of the plurality of shielding members from the printed circuit board is greater than a height of the transmission antenna and a height of the reception antenna.

3. The image display device according to claim 2, wherein loss tangents of the plurality of shielding members are greater than loss tangents of the first protective member and the second protective member.

4. The image display device according to claim 3, further comprising:
a power output unit disposed on the one surface of the housing; and
a power input unit disposed at a position on the opposite surface of the housing corresponding to a position of the power output unit.

5. The image display device according to claim 4, wherein one of the power input unit and the power output unit comprises a first connector protruding to a predetermined height from the housing, and
wherein a remaining one of the power input unit and the power output unit comprises a second connector formed corresponding to the first connector, the second connector being disposed in a recessed portion recessed to a predetermined depth in the housing.

6. The image display device according to claim 1, further comprising a controller configured to:
modulate a signal through an amplitude shift keying method,
transmit the modulated signal, and
demodulate a received signal through the amplitude shift keying method.

7. The image display device according to claim 6, wherein the first wireless communication module and the second wireless communication module are configured to transmit and receive a signal using a frequency band of 57 GHz to 71 GHz.

8. A video wall comprising:
a plurality of image display devices,
wherein each of the plurality of image display devices comprises:
a housing;
a display configured to display an image;
a first wireless communication module disposed on one surface of the housing; and
a second wireless communication module disposed at a position on an opposite surface of the housing corresponding to a position of the first wireless communication module,
wherein each of the first wireless communication module and the second wireless communication module comprises:
a printed circuit board;
a transmission antenna and a reception antenna mounted on the printed circuit board;
a plurality of shielding members disposed on the printed circuit board to surround each of the transmission antenna and the reception antenna; and
a protective member in contact with the plurality of shielding members,
wherein a first protective member in the first wireless communication module is disposed at a position recessed by a predetermined depth from the one surface of the housing,
wherein a second protective member in the second wireless communication module is disposed at a position recessed by the predetermined depth from the opposite surface of the housing such that an gap is formed between the first protective member and the second protective member when the one surface of the housing and the opposite surface of the housing are brought in contact with each other,
wherein, among the plurality of image display devices, a first image display device and a second image display device are disposed adjacent to each other such that the first wireless communication module of the first image display device and the second wireless communication module of the second image display device face each other.

9. The video wall according to claim 8,
wherein the first image display device and the second image display device are disposed adjacent to each other such that the transmission antenna of the first image display device and the reception antenna of the second image display device face each other and such that the reception antenna of the first image display device and the transmission antenna of the second image display device face each other.

10. The video wall according to claim 8, wherein a height of the plurality of shielding members from the printed circuit board is greater than a height of the transmission and a height of the reception antenna.

11. The video wall according to claim 10, wherein loss tangents of the plurality of shielding members are greater than loss tangents of the first protective member and the second protective member.

12. The video wall according to claim 11, wherein each of the plurality of image display devices further comprises:
a power output unit disposed on the one surface of the housing; and
a power input unit disposed at a position on the opposite surface of the housing corresponding to a position of the power output unit,
wherein one of the power input unit and the power output unit comprises a first connector protruding to a predetermined height from the housing,
wherein a remaining one of the power input unit and the power output unit comprises a second connector formed corresponding to the first connector, the second connector being disposed in a recessed portion recessed to a predetermined depth in the housing, and
wherein the first connector of the first image display device and the second connector of the second image display device are electrically engaged with each other.

13. The video wall according to claim 8, wherein the first wireless communication module and the second wireless communication module transmit and receive a signal using a frequency band of 57 GHz to 71 GHz, and wherein each of the plurality of image display devices modulates a signal through an amplitude shift keying method, transmits the modulated signal, and demodulates a received signal through the amplitude shift keying method.

\* \* \* \* \*